(12) United States Patent
Denys et al.

(10) Patent No.: US 7,938,438 B2
(45) Date of Patent: May 10, 2011

(54) THREE-CHAMBER ADAPTIVE SIDE AIRBAG

(75) Inventors: Isabelle Denys, Valladolid (ES); Luis José Duarte De Arez, Valladolid (ES)

(73) Assignee: Dalphi Metal España, S.A., Madrid (ES)

( * ) Notice: Subject to any disclaimer, the term of this patent is extended or adjusted under 35 U.S.C. 154(b) by 205 days.

(21) Appl. No.: 12/157,197

(22) Filed: Jun. 6, 2008

(65) Prior Publication Data
US 2009/0001692 A1 Jan. 1, 2009

(30) Foreign Application Priority Data

Jun. 29, 2007 (EP) .................................. 07380196

(51) Int. Cl.
*B60R 21/233* (2006.01)
(52) U.S. Cl. ...................... 280/730.2; 280/742; 280/729
(58) Field of Classification Search .................. 280/729, 280/743.2, 730.2, 742
See application file for complete search history.

(56) References Cited

U.S. PATENT DOCUMENTS

| | | | | |
|---|---|---|---|---|
| 5,240,283 A * | 8/1993 | Kishi et al. | ..................... | 280/729 |
| 5,692,774 A * | 12/1997 | Acker et al. | ................... | 280/729 |
| 5,845,935 A * | 12/1998 | Enders et al. | .............. | 280/743.2 |
| 5,853,191 A * | 12/1998 | Lachat | ........................ | 280/730.2 |
| 5,945,184 A * | 8/1999 | Nagata et al. | ................. | 428/35.2 |
| 6,059,312 A * | 5/2000 | Staub et al. | .................... | 280/729 |
| 6,364,348 B1 * | 4/2002 | Jang et al. | ................... | 280/730.2 |
| 6,439,606 B2 * | 8/2002 | Okada et al. | ................ | 280/743.1 |
| 6,478,329 B1 * | 11/2002 | Yokoyama | ..................... | 280/729 |
| 6,536,800 B2 * | 3/2003 | Kumagai et al. | ............ | 280/743.1 |
| 6,554,313 B2 * | 4/2003 | Uchida | ......................... | 280/729 |
| 6,692,023 B2 * | 2/2004 | Tokita et al. | ................ | 280/743.1 |
| 7,000,943 B2 * | 2/2006 | Hasebe et al. | ................. | 280/729 |
| 7,000,947 B2 * | 2/2006 | Kumagai et al. | ............ | 280/743.1 |
| 7,059,634 B2 * | 6/2006 | Bossecker et al. | ............ | 280/739 |
| 7,066,487 B2 * | 6/2006 | Sullivan et al. | ................ | 280/729 |
| 7,111,866 B2 * | 9/2006 | Abe et al. | ....................... | 280/729 |
| 7,134,691 B2 * | 11/2006 | Dunkle et al. | ............... | 280/743.2 |
| 7,360,789 B2 * | 4/2008 | Bito | ............................ | 280/743.1 |
| 7,431,329 B2 * | 10/2008 | Taguchi et al. | ................ | 280/729 |
| 7,445,232 B2 * | 11/2008 | Takimoto | ....................... | 280/729 |
| 7,458,605 B2 * | 12/2008 | Hasebe et al. | ................. | 280/729 |
| 7,543,850 B2 * | 6/2009 | Bachraty et al. | ............ | 280/743.1 |
| 7,549,674 B2 * | 6/2009 | Yoshikawa et al. | ........... | 280/740 |
| 7,604,252 B2 * | 10/2009 | Heitplatz et al. | ............ | 280/730.1 |
| 2005/0161918 A1 * | 7/2005 | Bito | ............................... | 280/732 |
| 2006/0202450 A1 * | 9/2006 | Madasamy et al. | ........... | 280/729 |
| 2006/0232049 A1 * | 10/2006 | Abe | ............................... | 280/729 |
| 2007/0001433 A1 * | 1/2007 | Gu et al. | ........................ | 280/729 |
| 2007/0257473 A1 * | 11/2007 | Choi | .............................. | 280/735 |
| 2009/0152844 A1 * | 6/2009 | Choi | .............................. | 280/729 |

* cited by examiner

*Primary Examiner* — Paul N Dickson
*Assistant Examiner* — Timothy D Wilhelm
(74) *Attorney, Agent, or Firm* — Ladas & Parry

(57) ABSTRACT

The invention relates to a side airbag module for an automotive vehicle which includes an inflatable bag (11) configured to be deployed between an occupant and the vehicle body upon being filled with the gas produced by a generator, which bag comprises a front panel (21) intended to make contact with the occupant, a rear panel (23) and at least one inner panel (25) forming a first chamber (13) with the rear panel (23) and a second chamber (15) with the front panel (21), having a vent hole (19), the inner panel (25) including a duct (39) allowing the passage of gas from the first chamber (13) to the second chamber (15) and which is located in a position allowing it to be blocked upon the front panel (21) moving closer to the inner panel (25) during the contact of the bag (11) with the occupant.

8 Claims, 2 Drawing Sheets

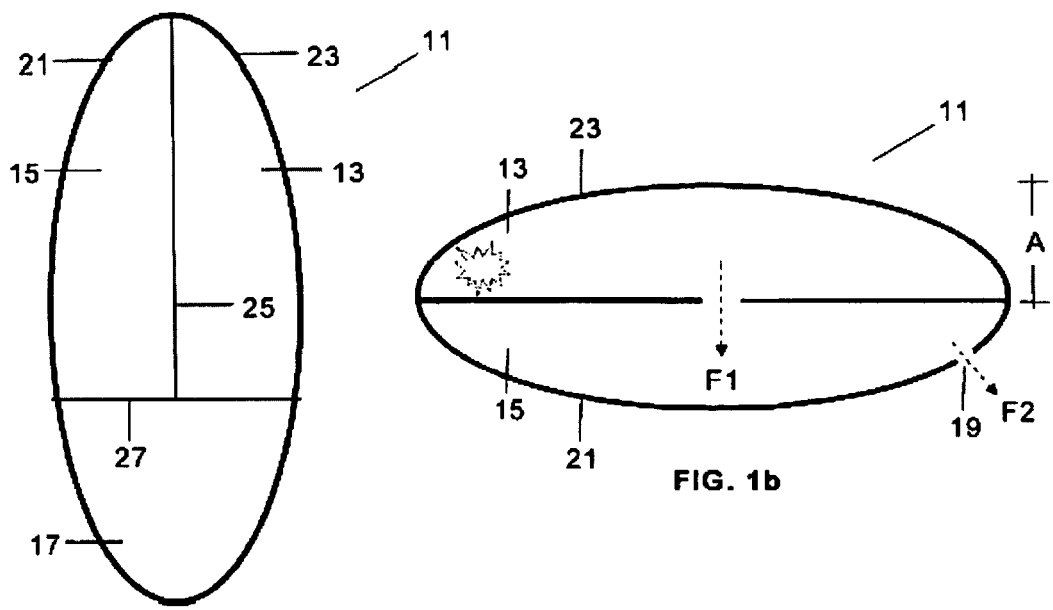
FIG. 1a
FIG. 1b
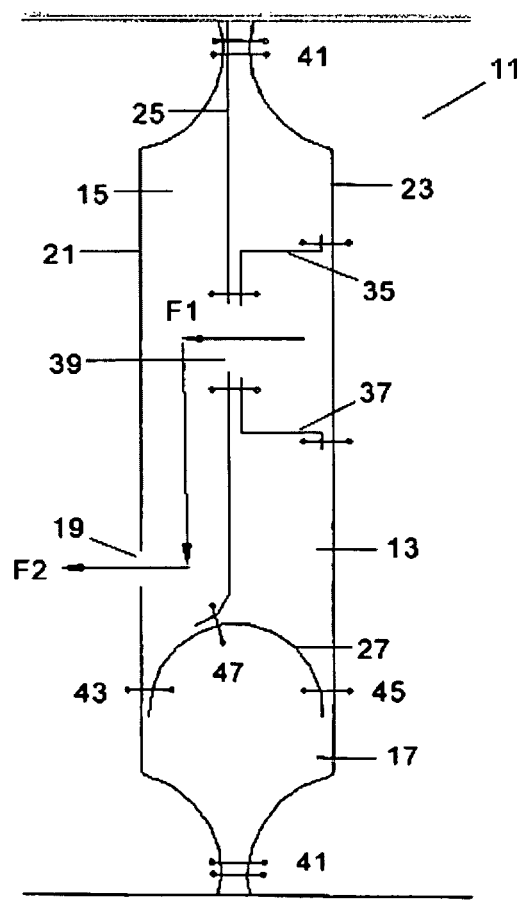
FIG. 2

THREE-CHAMBER ADAPTIVE SIDE AIRBAG

FIELD OF THE INVENTION

The present invention relates to a side airbag module used in vehicles to cushion the blows suffered by drivers and passengers in the event of crashes or collisions and more particularly, to a side airbag module which can adapt to crashes or collisions of different severity.

BACKGROUND OF THE INVENTION

A lateral airbag basically consists of a folded bag which is quickly inflated by means of a gas produced by a generator when certain sensor devices detect a vehicle collision. The bag is thus deployed between the vehicle occupant and, usually, a vehicle door and protects him or her during the collision.

In the normal bag deployment operation, the internal pressure produced by the generator upon filling it with gas can be sufficiently high to cause the bag to be so hard that the occupant rebounds. To prevent this drawback, such bags have been provided with a vent hole which is used to reduce the internal pressure of the bag and therefore the possibility of causing injuries when they are activated.

In turn, the use of several means for plugging this vent hole is known so as to achieve a better control of internal pressure in the bag than that provided exclusively by the variation of the dimension of the hole. In this sense, the use of patches to prevent the gas from immediately leaving through the discharge hole, but rather to leave when the patch breaks upon reaching a certain pressure inside the bag, must be emphasized. The art has proposed different types of patches with different means for controlling its breakage according, to a greater or lesser extent, to a certain resistance to the gas pressure inside the bag. The presence of the necessary gas pressure for the bag to fulfill its protective function is thus made compatible with the assurance that the gas pressure will not a reach an excessive value, with the risk for the persons on which the bag is deployed.

In addition, the need has also arisen for vent devices which allow increasing the gas outflow according to the specific characteristics of each collision and of the type of passenger affected and in this sense, several solutions of vent devices are also known offering vent holes with an adjustable surface, facilitating the increase of the vent area as the internal pressure in the bag increases.

A new need which has arisen considers the need for airbags which allow reducing the vent area, even eliminating it completely, in certain impact conditions, which requires blocking mechanisms which must operate in an opposite manner to those indicated. The aforementioned traditional patches had to completely plug the outlet until the internal pressure of the gas in the bag did not reach a certain level and later they broke and stopped acting, now the opposite is required: devices which allow blocking the vent hole in certain situations.

Some proposals are know to that effect such as that described in document WO 2006/050757, relating to a multichamber bag which can provide different hardness levels depending on the size of the occupant. Said bag contains at least one auxiliary chamber the function of which is to regulate the pressure in the main chamber or chambers. Gas is discharged through a vent hole located in the auxiliary chamber, which vent hole incorporates a device which allows blocking the exit of gas in the event that the occupant is tall. This proposal provides a side airbag with an adaptive capacity for the size of the occupant but its drawback is that it lacks adaptive capacity for different crash configurations.

In addition, another type of proposals of adaptive side airbags is known, such as that described in patent document U.S. Pat. No. 6,976,702 relating to a two-chamber (pelvis-chest) bag with the generator located in the lower chamber (pelvis chamber) and in which the upper chamber (chest chamber) is inflated from the lower chamber so as to achieve moving the occupant due to the high pressure obtained in the lower chamber which does not have a vent area. As in the previous case, the drawback of this proposal is that it lacks adaptive capacity for different crash configurations.

The present invention is aimed at solving said drawbacks.

SUMMARY OF THE INVENTION

An objective of the present invention is to provide a side airbag module with venting that is adjustable to different conditions of severity of the crash or collision. Different crash configurations and the evolution predicted in them (increase of impact speed, barrier change, . . . ) contemplated by the administrative regulations and/or demanded by consumers must be taken into account.

Another objective of the present invention is to provide a side airbag module which allows controlling the stress applied in the side of the occupant. i.e., in chest, abdomen or pelvis according to needs. Controlling the stress prevents injuring the occupant.

These and other objectives are achieved by means of a side airbag module with a bag which can be inflated with the gas produced by a generator when a collision occurs and which is configured to be deployed between a vehicle occupant and the vehicle body, in which airbag module the bag comprises a front panel intended to make contact with the occupant, a rear panel and at least one inner panel forming a first chamber with the rear panel and a second chamber with the front panel including at least one vent hole and a duct allowing the passage of gas from the first chamber, where the gas from the generator is received, to the second chamber during the deployment of the bag, said duct being located in a position which, upon the front panel moving closer to the inner panel during the contact of the bag with the occupant, allows it to be blocked for the purpose of maintaining a sufficient gas volume inside the bag preventing the occupant from reaching the vehicle body.

An advantage of the present invention is that the adaptability of the airbag module to the crash conditions is of the passive type and therefore it does not need any signal to be activated.

Another advantage of the present invention is the low cost involved in providing the conventional side airbag module with adaptability to the crash conditions.

Other features and advantages of the present invention will be understood from the following detailed description of several illustrative and by no means limiting embodiments of its object in relation to the attached drawings.

DESCRIPTION OF THE DRAWINGS

FIGS. 1a, 1b show schematic front sectional and plan views of the bag of a side airbag module according to the present invention.

FIG. 2 shows a schematic front sectional view of the bag of a side airbag module according to the present invention, showing the panels forming it.

DETAILED DESCRIPTION OF THE INVENTION

Figure 3A:
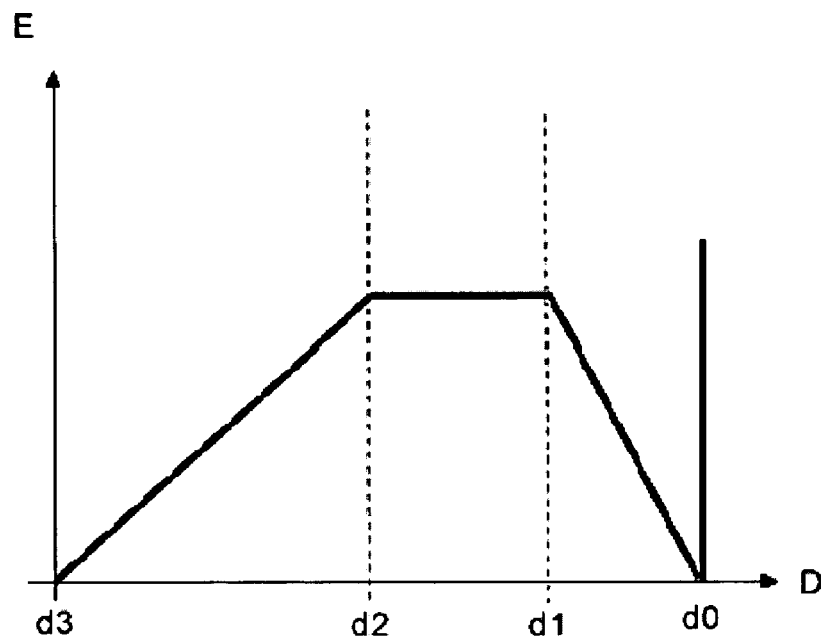
FIGS. 3a and 3b shows stress-displacement diagrams, showing the adaptive capacity of a side airbag module according to the present invention.

The bag 11 of a side airbag module according to the embodiment of the invention shown in the Figures comprises three chambers 13, 15, 17 delimited by the front panel 21, the rear panel 23 and two inner panels 25, 27.

The first two chambers 13, 15 are intended to protect the chest of the occupant and the third chamber 17 is intended to protect the pelvis.

The front panel 21 and the rear panel 23 are joined at their perimetrical edges by means of seams 41. The inner panel 27 is joined at its edges to the front panel 21 and to the rear panel 23 by means of seams 43, 45 and the inner panel 25 is joined on one hand to the perimetrical edges of the front panel 21 and the rear panel 23 by means of seams 41 and on the other hand to the inner panel 27 by means of seams 47.

As the person skilled in the art will understand, the manner of joining the panels is not a limiting feature of the present invention, which is also applicable to bags formed with a single part.

The inner panel 25 separating the first two chambers 13 and 15 includes a duct 39 for the passage of the gas from the first chamber 13 to the second chamber 15 and is joined to the rear panel 23 by two lower ties 35, 37, apart from by its perimetrical edge.

The function of said ties 35, 37 is to control the width W of the first chamber 13 for the purpose of on one hand, allowing the passage of the gas to the second chamber 15 and on the other hand, facilitating the end of the passage of the gas between the two chambers 13, 15 when it is appropriate to completely or partially prevent the exit of gas through the vent hole 19.

A single tie or more than two ties can be used to limit the width W of the first chamber 13 in other embodiments of the invention.

The duct 39 can be formed by one or several holes made in the panel 25.

The gas from the generator (now shown) directly enters the first chamber 13 and the third chamber 17. It passes from the first chamber 13 to the second chamber 15 through the duct 39 in the inner panel 25 as indicated by arrow A1. In the second chamber 15, there is a vent hole 19 allowing the exit of gas to the exterior as indicated by arrow A2.

When the bag 11 reaches the occupant, the second chamber 15 starts to be compressed until the front panel 21 contacts the central inner panel 25. At this point the duct 39 is plugged, stopping the passage of gas from the first chamber 13 to the second chamber 15, thus preventing the exit of gas in the first chamber to the exterior through the vent hole 19.

The location of the duct 39 must be such that it is opposite to the chest of the occupant at the time of contact so that the duct 39 can be plugged upon pushing the front panel 21. It will preferably be located in the central area of the inner panel 25.

In another embodiment of the invention, the bag 11 would not comprise the mentioned third chamber 17 and would protect the chest-pelvis assembly or only the chest with the first two chambers.

Figure 3B:
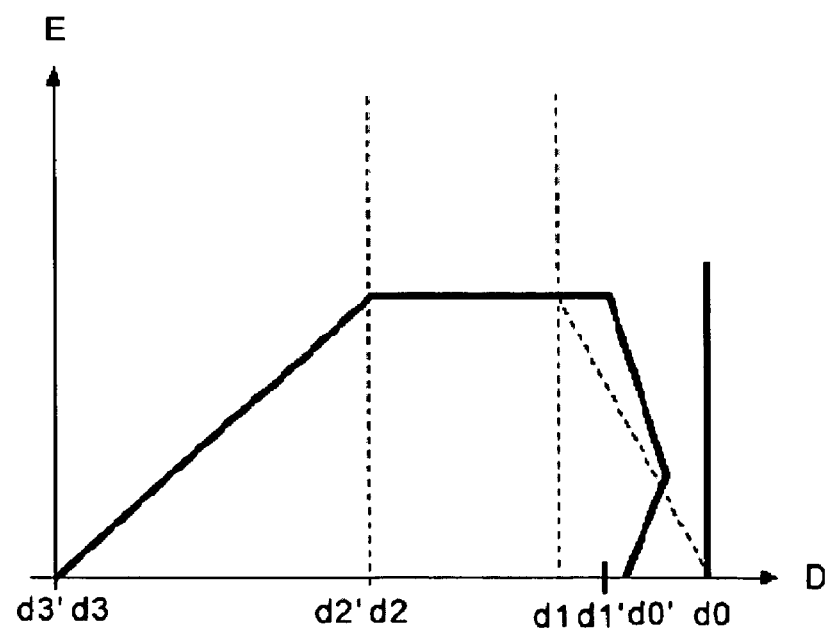

The improvement of the adaptability of the side airbag according to the invention is shown in FIGS. 3b and 3a showing respectively Stress (S)/Displacement (D) graphs of a side airbag with and without capacity of adaptation to crashes with a different degree of severity, S being the stress applied by the bag of the airbag on the occupant and D being the position of the occupant with respect to the vehicle door.

FIG. 3a shows three sections in the graph as a result of the evolution of pressure in the bag: in a first section between displacement d3, when the bag of the airbag makes contact with the occupant, and displacement d2, the stress S increases constantly as a result of the increase of the gas pressure, in a second section between displacement d2 and displacement d1, the stress is constant as the increase of the gas pressure is compensated with the leaks through the vent hole, the bag fabric and where appropriate through the joining seams of the panels, and in the final section between displacement d1 and displacement d0, in which the occupant would contact the vehicle door, the stress decreases constantly as the gas pressure inside the bag decreases.

FIG. 3b, including the graph of FIG. 2a in a dotted line in the non-coinciding section together with the graph of the side airbag according to the present invention, shows the following differences with respect to FIG. 2a:
- The first section between displacement d3' and displacement d2' is similar: the stress S increases constantly as a result of the increase of the gas pressure
- In the second section, there is a delay in the end thereof in displacement d1' since the gas leaks decrease as the main panel 21 moves closer to the inner panel 25.
- In the third section, the vent hole is closed whereby gas is kept inside the bag of the airbag, preventing the contact between the occupant and the vehicle door. Its start is therefore delayed to displacement d1' and its end is advanced to displacement d0'.

This performance of the bag allows it to effectively protect one and the same occupant in different crash configurations with different intrusion speeds, for example, a crash configuration with two types of barriers and two speeds or a crash configuration with a barrier and three speeds.

Although several embodiments of the invention have been described and shown, modifications comprised within the scope of such invention can be comprised therein, the latter must not be considered as limited to said embodiment but to the content of the following claims.

The invention claimed is:

1. A side airbag module for an automotive vehicle comprising a bag (11) which can be inflated with the gas produced by a generator when a collision occurs, and which is configured to be deployed between a vehicle occupant and a vehicle body, wherein:
   a. the bag (11) comprises a front panel (21) intended to make contact with an occupant, a rear panel (23), and at least one inner panel (25) forming a first chamber (13) with the rear panel (23) and a second chamber (15) with the front panel (21) in which at least one vent hole (19) is included;
   b. the inner panel (25) includes a duct (39) allowing the passage of gas from the first chamber (13), where the gas from the generator is received, to the second chamber (15) during the deployment of the bag (11), and is located in a position which, upon the front panel (21) moving closer to the inner panel (25) during the contact of the bag (11) with the occupant, allows it to be blocked for the purpose of maintaining a sufficient gas volume inside the bag (11) preventing the occupant from reaching the vehicle body; and
   c. a second inner panel (27) to form together with the front panel (21) and the rear panel (23) a third chamber (17) in the lower part of the bag (11).

2. A side airbag module for an automotive vehicle according to claim 1, wherein the first chamber (13) includes means for limiting a width W of the first chamber during the deployment of the bag (11).

3. A side airbag module for an automotive vehicle according to claim 2, wherein said means for limiting the width W of the first chamber consist of one or more ties (35, 37) joined at their ends to the inner panel (25) and to the rear panel (23).

4. A side airbag module for an automotive vehicle according to claim 1, wherein said duct (39) is formed by a single hole in the inner panel (25).

5. A side airbag module for an automotive vehicle according to claim 1, wherein said duct (39) is formed by a plurality of holes in the inner panel (25).

6. A side airbag module for an automotive vehicle according to claim 1, wherein the first and second chambers (13, 15) are intended to protect the chest of the occupant and the third chamber (17) is intended to protect the pelvis of the occupant.

7. A side airbag module for an automotive vehicle comprising a bag (11) which can be inflated with the gas produced by a generator when a collision occurs, and which is configured to be deployed between a vehicle occupant and a vehicle body, wherein:

a. the bag (11) comprises a front panel (21) intended to make contact with an occupant, a rear panel (23), and at least one inner panel (25) forming a first chamber (13) with the rear panel (23) and a second chamber (15) with the front panel (21);

b. the inner panel (25) includes a duct (39) allowing the passage of gas from the first chamber (13), where the gas from the generator is received, to the second chamber (15) during the deployment of the bag (11), and is located in a position which, upon the front panel (21) moving closer to the inner panel (25) during the contact of the bag (11) with the occupant, allows it to be blocked for the purpose of maintaining a sufficient gas volume inside the bag (11) preventing the occupant from reaching the vehicle body; and c. a second inner panel (27) to form together with the front panel (21) and the rear panel (23) a third chamber (17) in the lower part of the bag (11).

8. A side airbag module for an automotive vehicle according to claim 7, wherein said inner panel (25) is joined at its edges to the front panel (21) and to the rear panel (23), and also is joined to the second inner panel (27).

* * * * *